United States Patent

[11] 3,616,204

| [72] | Inventor | Richard R. Linn |
|---|---|---|
| | | Ponca City, Okla. |
| [21] | Appl. No. | 828,780 |
| [22] | Filed | May 28, 1969 |
| [45] | Patented | Oct. 26, 1971 |
| [73] | Assignee | Continental Oil Company |
| | | Ponca City, Okla. |

[54] METHOD FOR SOIL RESTORATION
8 Claims, No Drawings

| [52] | U.S. Cl. | 195/2, 47/1, 195/3 H |
|---|---|---|
| [51] | Int. Cl. | C12b 1/00 |
| [50] | Field of Search | 195/2, 3 H, 103.5 P, 28 |

[56] References Cited

OTHER REFERENCES

Engel et al., " Ecological Aspect of Hydrocarbon Contamination," Dev. in Ind. Micro Vol. 7 pp. 354– 366, 1966.

Lindblom et al. " Organic Geochemistry," Dev. in Ind. Micro., Vol. 2, pp. 9– 21, 1961.

*Primary Examiner—* A. Louis Monacell
*Assistant Examiner—* Gary M. Nath
*Attorneys—* Joseph C. Kotarski, Henry H. Huth, Jerry B. Peterson, William A. Mikesell, Jr. and Carroll Palmer

ABSTRACT: Soil contaminated by hydrocarbon spillage is restored by first disturbing the soil, as by plowing or discing, followed by inoculating with a hydrocarbon-consuming microorganism and maintaining an environment controlled as to nutrient and oxygen content.

METHOD FOR SOIL RESTORATION

This invention relates to a method for restoring hydrocarbon-contaminated soil. In one aspect, the invention relates to a method for effecting consumption of hydrocarbon contaminants in soil by use of micro-orgamisns in a controlled environment.

The increasing use of cross-country pipelines to carry crude oil and refined hydrocarbon products has inevitably led to more frequent instances of soil contamination by spillage, leakage, or pipeline rupture. Such instances usually require compensation to the land owner, even though the owner would often prefer that his land be restored to productivity and improved esthetically rather than receiving compensation. Restoration of this type has been virtually impossible in the past.

It is accordingly an object of this invention to provide a method for reducing the contamination of soil by hydrocarbons spilled or otherwise accidentally deposited therein.

Other aspects, objects, and the several advantages of the invention will become apparent upon study of this disclosure and the appended claims.

According to the invention, a soil which has been contaminated by hydrocarbon spillage is treated by first disturbing the soil to increase its liquid permeability and by then inoculating it with selected micro-orgamisms, nutrient solution, and gaseous environment, and finally if desired by killing the micro-orgamisms after the appropriate degree of hydrocarbon has been consumed.

Many species of yeast, bacteria and molds are known to consume hydrocarbons and their derivatives, such as sulfur-containing organic compounds. Some species are rather specific in metabolizing cycloaliphatic hydrocarbons, others require organic sulfur compounds, still others require straight-chain paraffins of various molecular weight ranges, yet others attack aromatic hydrocarbons, etc. Most of these micro-organisms are aerobic, i.e., they require molecular oxygen in addition to the carbon from the organic compounds. Further, most require a nutrient medium containing various mineral salts and, depending on the species, pH within a controlled range.

Because of the requirements by the micro-organisms of controlled environment, the present invention contemplates an initial treatment of the contaminated soil area to increase its fluid permeability as may be necessary, depending on the nature of the soil and the depth and intensity of the spill. Soils which are sandy or otherwise permeable will not generally require much initial treatment, for example a light treatment with a disc or harrow. Soils of high clay content, on the other hand, may require an extensive initial treatment, such as plowing or heavy discing. The depth of the spill, i.e., whether the spill or leakage emanates from a deeply buried pipeline or from a surface source, will also affect the amount of initial treatment required, as will the intensity or severity of the spill. The object of the initial treatment being to achieve reasonable contact between the spilled liquid and a liquid nutrient and inoculant and a gaseous growth environment, the amount of and severity of the initial soil-disturbing treatment necessary to obtain satisfactory final results can be ascertained by one skilled in the art.

The next step contemplated by the present invention comprises saturating the soil contaminated by the spill with a liquid nutrient, which can also conveniently contain the micro-organism inoculant culture. The culture can be injected into the affected soil just prior or subsequent to application of the nutrient medium but, as stated, is advantageously applied simultaneously therewith. As noted above, the nutrient medium comprises an aqueous solution of various salts, such as nitrates, phosphates, carbonates, and various sodium, ammonium, and potassium salts. Depending on the culture being used, the pH of the nutrient medium is sometimes rather critical and, in such instances, the medium can be buffered to within the desired pH range to decrease any effect of the soil on nutrient pH. Formulation of nutrient media suitable for various specific cultures is within the skill of the art.

Exemplary but not limiting of microorganisms useful in the practice of this invention are *Candida lipolytica*, *Candida tropicalis*, *Pseudomonas methanica*, *Pseudomonas methanitrificans*, *Methylococcus capsulatus*, *Aerobacter aerogenes*, *Pseudomonas aeruginosa*, various *Nocardia* species, other *Candida* species, various *Streptomyces* species, and various yeasts. The microorganism culture can comprise a single strain suitable for metabolizing spills of a single hydrocarbon type, or can comprise mixed strains tailored or suitable for a spill containing mixed hydrocarbons. It is also within the scope of the invention to condition a culture to the fluid spilled, and to then inoculate the spill area with such conditioned culture. Spills which can be treated by the method of this invention include but are not limited to those comprising sweet or sour crude oil, gasolines, gas oils, naphthas, diesel fuel, and other normally liquid hydrocarbons.

It is recognized that optimum growth rates for most microorganism are achieved only when intimate and thorough contact of the culture, the nutrient medium, the hydrocarbon substrate, and in the case of aerobic species, oxygen, are maintained. Such optimum propagation rates are desirable when producing, e.g., comestible protein on a commercial basis, but are not necessary when cleaning up spills; it is only necessary to maintain conditions such that the culture survives until the desired degree of decontamination is achieved. One useful technique involves the desired addition to the soil of aqueous nutrient medium saturated with dissolved oxygen in the case of aerobic species. Additions of culture and of nutrient medium can be effected in any suitable manner, as by liquid spray onto the soil or injection into the soil using perforated probe rods.

It is sometimes desirable, where terrain and soil conditions permit, to cover over the spill area with a flexible plastic or other gas-impermeable sheet or film weighted down at its edges so as to form a gastight seal with the ground. This plastic diaphragm of low gas permeability can then be inflated to expose the contaminated soil to a controlled atmosphere, such as air or oxygen. Nitrogen or other inert gas can be used as the gaseous environment in the event of using an anaerobic culture. The gaseous environment and nutrient solution are preferably devoid of hydrocarbon substrate, although it is within the scope of the invention to include supplemental amounts of such substrate therein in the event difficulties are encountered in maintaining the culture. Nutrient solution can be periodically sprayed through ports in the tent, and a certain degree of temperature control can be effected by heating or cooling any gas or liquid streams passed therein. After the desired degree of restoration of the soil has been achieved through metabolism by the micro-organisms, a final optional step comprises killing the residual culture in the soil. This is often not necessary, in that the culture will become starved as the hydrocarbon substrate supply is depleted. However, should it be desired to immediately use the area for a crop which is inoculated, e.g., soy beans, the culture can be quickly killed by saturating the soil with a liquid of suitable pH, by removing the supply of air from the tent, or by otherwise unfavorably adjusting the environment. As a final step, the reconditioned soil can be plated, sodded, or otherwise landscaped as may be desired.

The invention will now be further explained by the following example, which is illustrative and not limiting.

EXAMPLE

A small rapture in a pipeline carrying mixed n-paraffins occurs, contaminating the sandy loam soil for an area about 5 feet wide, 10 feet long, and 1½ feet in depth. The area is first subjected to light treatment with a disc, and is then covered over with a sheet of 10-mil polyethylene film 20 feet by 30 feet. The sheet is weighted down at its edges by piling sand thereon. It is then inflated to form a bulge about 5 feet high at its center by connecting an air blower thereto. A nozzle is passed through the tent wall, and an aqueous nutrient solution containing a mixed *Aerobacter* culture is sprayed therethrough so as to saturate the soil. This treatment with nutrient medium and culture is repeated about every 12 hours for 3 days, at the end of which time the paraffin contaminant in the soil is substantially depleted.

Although this invention has been described with respect to particular embodiments thereof, it is not to be so limited, as changes and modifications may be made therein which are within the spirit and scope of the invention as defined by the appended claims.

What is claimed is:

1. The method of reducing contamination of a soil induced by accidental spillage of a liquid containing hydrocarbon or sulfur-containing derivatives thereof which comprises:
   a. increasing the fluid permeability of said soil,
   b. inoculating said contaminated soil with a micro-organism capable of metabolizing said organic compound,
   c. contacting said soil with an aqueous nutrient solution comprising inorganic salts, and
   d. maintaining adjacent said soil a gaseous environment favorable to propagation of said micro-organism 2. The method of claim 1 wherein said inoculating of step (b) is effected prior to said contacting of step (c).

3. The method of claim 1 wherein said inoculating of step (b) is effected subsequent to said contacting of step (c).

4. The method of claim 1 wherein said inoculating of step (b) is effected simultaneous with said contacting of step (c).

5. The method of claim 1 wherein said organic compound comprises a normally liquid hydrocarbon.

6. The method of reducing contamination of a soil induced by accidental spillage of a normally liquid hydrocarbon which comprises:
   a. increasing the fluid permeability of said soil by disturbing the upper surface thereof,
   b. contacting said soil with an aqueous nutrient solution comprising inorganic salts and with a microorganism capable of metabolizing said hydrocarbon,
   c. establishing a zone of controlled environment immediately above the upper surface of said soil, and
   d. passing into said zone a gas favorable to propagation of said micro-organism.

7. The method of claim 6 wherein said establishing is effected by positioning a membrane of low gas permeability adjacent the upper surface of said soil.

8. The method of claim 7 wherein said nutrient solution and said gas are devoid of hydrocarbon substrate.

* * * * *